No. 773,968. Patented November 1, 1904.

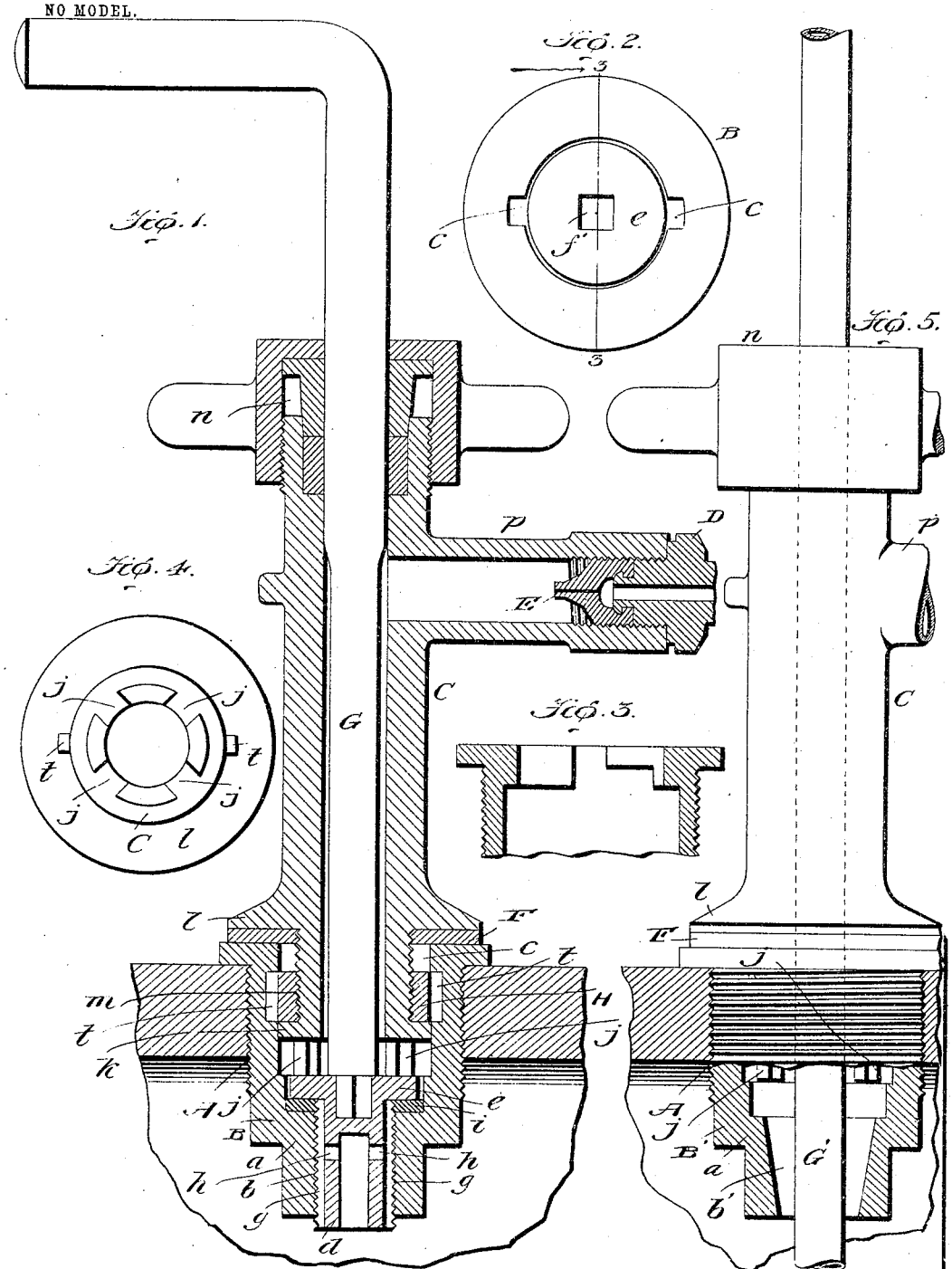

UNITED STATES PATENT OFFICE.

HENRY NADORFF, OF LOUISVILLE, KENTUCKY.

AIR CONNECTION AND TAP FOR BARRELS.

SPECIFICATION forming part of Letters Patent No. 773,968, dated November 1, 1904.

Application filed July 29, 1904. Serial No. 218,750. (No model.)

*To all whom it may concern:*

Be it known that I, HENRY NADORFF, a citizen of the United States, residing at Louisville, in the county of Jefferson and State of Kentucky, have invented new and useful Improvements in Air Connections and Taps for Barrels, of which the following is a specification.

My invention pertains to air connections and taps for beer and other barrels; and its novelty, utility, and practical advantages will be fully understood from the following description and claims when taken in connection with the accompanying drawings, forming part of this specification, in which—

Figure 1 is a view, partly in section and partly in elevation, illustrating my improvements in proper relation to a barrel when the improvements are used to effect an air connection. Fig. 2 is a plan view of the bushing comprised in the improvements. Fig. 3 is a detail diametrical section of the bushing. Fig. 4 is an inverted plan view of the lower end of the sleeve-section of the improvements; and Fig. 5 is a view, partly in side elevation and partly in diametrical section, illustrating a modification constituting a combined air connection and tap.

Referring by letter to the said drawings, and more particularly to Figs. 1 to 4 thereof, A is a bung-hole in a barrel, and B is the bushing of my improvements. The said bushing, which is preferably of metal, comprises a hollow exteriorly-threaded body $a$, having a central threaded aperture $b$ in its inner end, and also having interior bayonet-grooves $c$ extending inwardly from its outer end and a hollow exteriorly-threaded plug $d$ arranged in the aperture $b$ of body $a$, and having a head $e$ at its upper end, an angular socket $f$ in said end, grooves $g$ in its side, and apertures $h$ connecting its interior and said grooves $g$. Between the plug-head and the bottom of the body $a$ is arranged a gasket $i$, which is adapted when the plug is in the position shown in Fig. 1 to render air and gas tight the connection between the plug and the body. C is a sleeve-section forming part of the improved air connection. The said sleeve-section is notched at its lower end, as indicated by $j$, and is provided with flanges $k$ and $l$ and an exterior thread $m$, and is also provided with a stuffing-box $n$ and a lateral arm $p$. D is a nipple screwed into the outer end of the lateral arm $p$ of the sleeve-section C and adapted to be connected with a source of compressed-air or other fluid pressure supply. E is a non-return valve mounted on said nipple and arranged in the arm $p$. F is a gasket mounted on the sleeve-section at the under side of the flange $l$. G is a key snugly occupying the sleeve-section and having an angular lower end adapted to seat in the socket $f$ of the plug $d$, and H is an interiorly-threaded ring mounted on the threaded portion $m$ of the sleeve-section C and having opposite lugs $t$, adapted to take into the bayonet-grooves $c$ of the bushing B.

In the practical use of my improvements when it is desired to connect the sleeve-section C to the bushing B it is simply necessary to place said sleeve-section, with the lugs $t$ of ring H, in the grooves $c$ of the bushing B and then turn said sleeve-section on its axis. When this is done, it will be observed that the lugs $t$ will bring up against the inner ends of the grooves $c$, so that the continued turning of the sleeve-section will operate to carry said section down through the ring H, and thereby tightly compress the gasket F between the sleeve-section and the bushing and effect a strong connection of the sleeve-section to the bushing. It will also be observed that when the sleeve-section C is turned outwardly the ring H will be rendered loose in the bushing, and the sleeve-section may then be drawn endwise out of engagement with the bushing. In the position shown in Fig. 1 the plug $d$ of the bushing B will obviously prevent compressed air from gaining access to the interior of the barrel. When, however, the said plug is turned through the medium of the key G to raise the plug-head from the bottom of the bushing, it will be seen that compressed air is free to pass from the source of supply into the barrel through the sleeve-section and the bushing.

The modified construction shown in Fig. 5 comprises a bushing B' in combination with a sleeve-section C, similar in construction to the sleeve-section C, Figs. 1 to 4, and having the same appurtenances—i. e., a ring H and a gasket F and draft-tube G', extending through the sleeve-section and the bushing. The bushing B' is similar to the bushing B, except that it lacks the threaded aperture $b$ and the plug $d$ and is provided in lieu of said aperture $b$ and plug $d$ with a tapered bore $b'$. This latter is designed to receive a tapered plug (not shown) of cork or other suitable material, which tapered plug is displaced when the draft-tube is forcibly inserted to the position shown. With the parts in the position shown in Fig. 5 it will be observed that the sleeve-section C is tightly and strongly connected to the bushing B' and air under pressure is free to enter the barrel, while beer or other liquid may be drawn from the barrel through the tube G'.

In addition to the practical advantages which I have hereinbefore ascribed to my improvements it will be noticed that the improvements are very simple and inexpensive, and are also strong and durable, and therefore well calculated to withstand the rough usage to which such devices are ordinarily subjected.

I have entered into a detailed description of the present and preferred embodiments of my invention in order to impart a full, clear, and exact understanding of the same. I do not desire, however, to be understood as confining myself to such specific embodiments and arrangements of parts, as such changes or modifications may be made in practice as fairly fall within the scope of my invention as claimed.

Having described my invention, what I claim, and desire to secure by Letters Patent, is—

1. The combination of a bushing, a sleeve-section having an exteriorly-threaded portion, and an interiorly-threaded ring retained and movable on said threaded portion of the sleeve-section; the bushing and the ring being provided with coacting means whereby the latter is enabled to effect a tight connection of the sleeve-section to the former.

2. The combination of a bushing having interior bayonet-grooves, a sleeve-section having an exteriorly-threaded portion, and an interiorly-threaded ring retained and movable on the threaded portion of the sleeve-section, and having lugs adapted to enter and coöperate with the bayonet-grooves of the bushing.

3. The combination of a bushing having interior bayonet-grooves, a sleeve-section having a lateral arm adapted to be connected with a source of fluid-pressure supply, an end flange $k$ and an intermediate flange $l$, and also having an exteriorly-threaded portion between said flanges $k$ and $l$, a gasket mounted on the sleeve-section, below the flange $l$, and an interiorly-threaded ring mounted on the threaded portion of the sleeve-section between the flanges $k$ and $l$, and having exterior lugs adapted to enter and coöperate with the bayonet-grooves of the bushing.

4. In an air connection for barrels, the combination of a bushing comprising a body having interior bayonet-grooves, and also having a threaded aperture in its inner end, and a grooved and threaded plug occupying said aperture, and having an angular socket in its upper end, a sleeve-section having a lateral arm and an exteriorly-threaded portion, and also having a notched inner end, an interiorly-threaded ring retained and movable on the threaded portion of the sleeve-section and having lugs adapted to enter and coöperate with the bayonet-grooves of the bushing, and a key extending through the sleeve-section and having an angular inner end adapted to seat in the angular socket of the bushing-plug.

In testimony whereof I have hereunto set my hand in presence of two subscribing witnesses.

HENRY NADORFF.

Witnesses:
HARRY A. THORP,
PETER KALBFLEISCH, Jr.